March 29, 1927.
H. MARTIN
FLUID PRESSURE OPERATED MEANS FOR INDICATING THE QUANTITY AND
SPECIFIC GRAVITY OF THE LIQUID CONTENTS OF TANKS
Filed Aug. 7, 1926
1,622,794
2 Sheets-Sheet 1
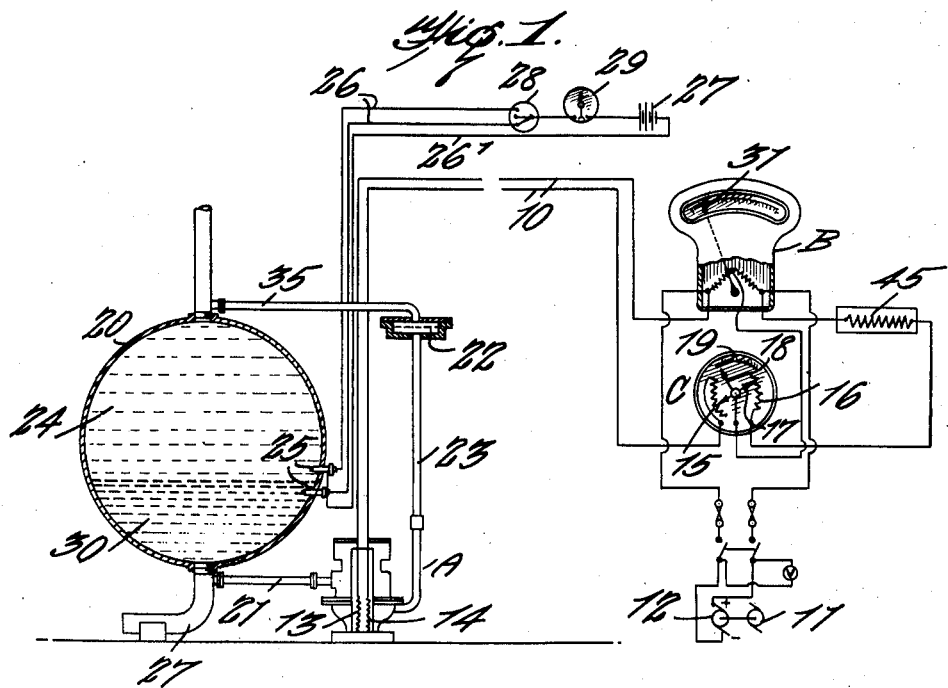
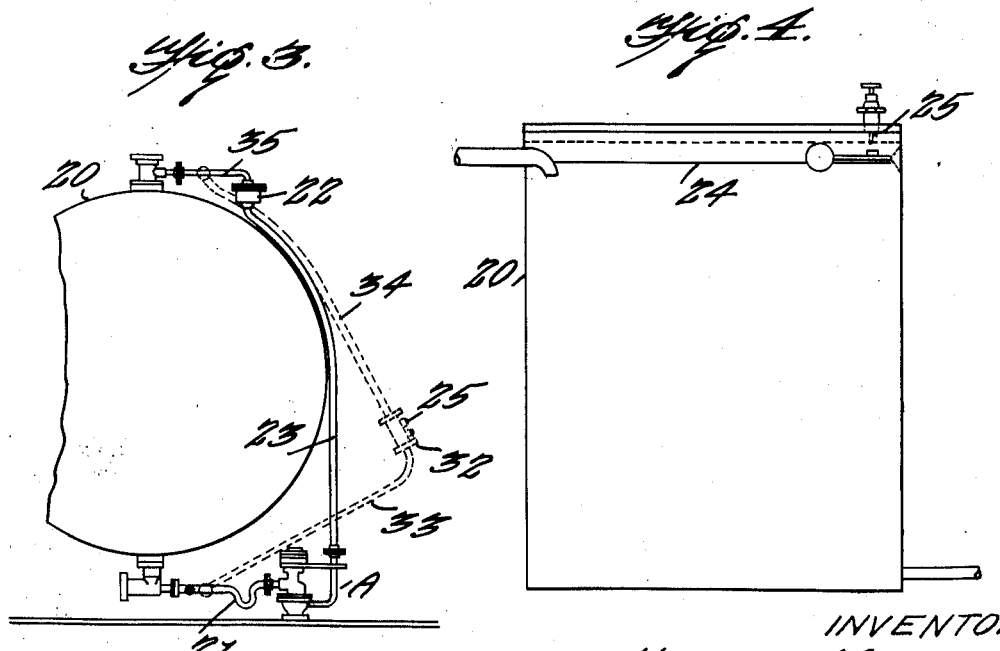
INVENTOR
HAROLD MARTIN,
BY
ATTORNEY.

Patented Mar. 29, 1927.

1,622,794

UNITED STATES PATENT OFFICE.

HAROLD MARTIN, OF PORTSMOUTH, ENGLAND.

FLUID-PRESSURE-OPERATED MEANS FOR INDICATING THE QUANTITY AND SPECIFIC GRAVITY OF THE LIQUID CONTENTS OF TANKS.

Application filed August 7, 1926, Serial No. 127,932, and in Great Britain March 4, 1925.

This invention refers to improvements in or relating to manometers of the U-tube or equivalent type which are used preferably to indicate variations in the quantity or depth of liquids at a position remote from the tank, vessel, or the like containing the liquid, and which are provided with means for correcting for variations in specific gravity.

In the specification of my prior British Letters Patent No. 164,828 is described an apparatus of this kind for indicating the movement of two columns of liquid such as mercury, contained in a U-tube manometer, to measure the depth, pressure, velocity or flow of the fluid, at a position removed from the measuring apparatus, by electrical means controlled or operated by relative variations in electrical resistance produced by the movement of the two columns of liquid. My further prior British Letters Patent No. 219,716, as well as my Patent No. 231,595, described further developments of apparatus of a similar type, designed and intended primarily for tank depth measurement.

It has been proposed, however, to use such apparatus for measuring the quantity of a liquid such as petrol or fuel oil contained in a tank in such a manner that it is always subject to displacement by water on leaving the tank. In these circumstances the tank is always full of liquid, consisting either of oil or water, or portions of both, and it is desired to ascertain the position of the line or demarcation between water and oil as a measure of the quantity of oil contained in the tank.

Such indication is quite possible by means of a sensitive form of the apparatus described in the above-mentioned previous patent specifications, utilizing the effect of the difference in pressure produced by the charges contained in the tank owing to the difference in the specific gravities of the water and the oil or petrol stored in the tank. To obtain the desired indications for the purpose of accurate measurement, however, it is necessary to known accurately the specific gravity of the oil or petrol as compared with that of the displacing water, as with any one particular calibration of the scale card of the indicating instrument, accurate indications or measurements will normally only be obtained of the quantity of oil or petrol of an exactly corresponding specific gravity.

It is desired, however, especially in the oil or petrol tanks of naval or mercantile marine vessels, to obtain satisfactory indications or measurements irrespective of the wide variations in the specific gravities of the oils or petrols which are necessarily encountered, and the object of the present invention is primarily to provide means to meet this requirement in a simple and satisfactory manner.

Now according to the present invention I provide in fluid pressure operated means of the type referred to, additional electrically operated means for indicating and compensating for the specific gravity of the liquid being measured.

In order that the invention may be clearly understood and more readily carried into effect, it is hereinafter described with reference to the accompanying drawings, in which:—

Figure 1 is a diagram illustrating the transmitter and indicating portion of the apparatus of the present invention combined with a petrol tank and also with a specific gravity indicator and compensator;

Figure 3 is a broken end elevation of a petrol tank, showing a modified arrangement.

Figure 4 is a detail sectional view illustrating the application of float-operated electrical contacts to the ordinary storage of liquids to show "tank full".

Figure 2:
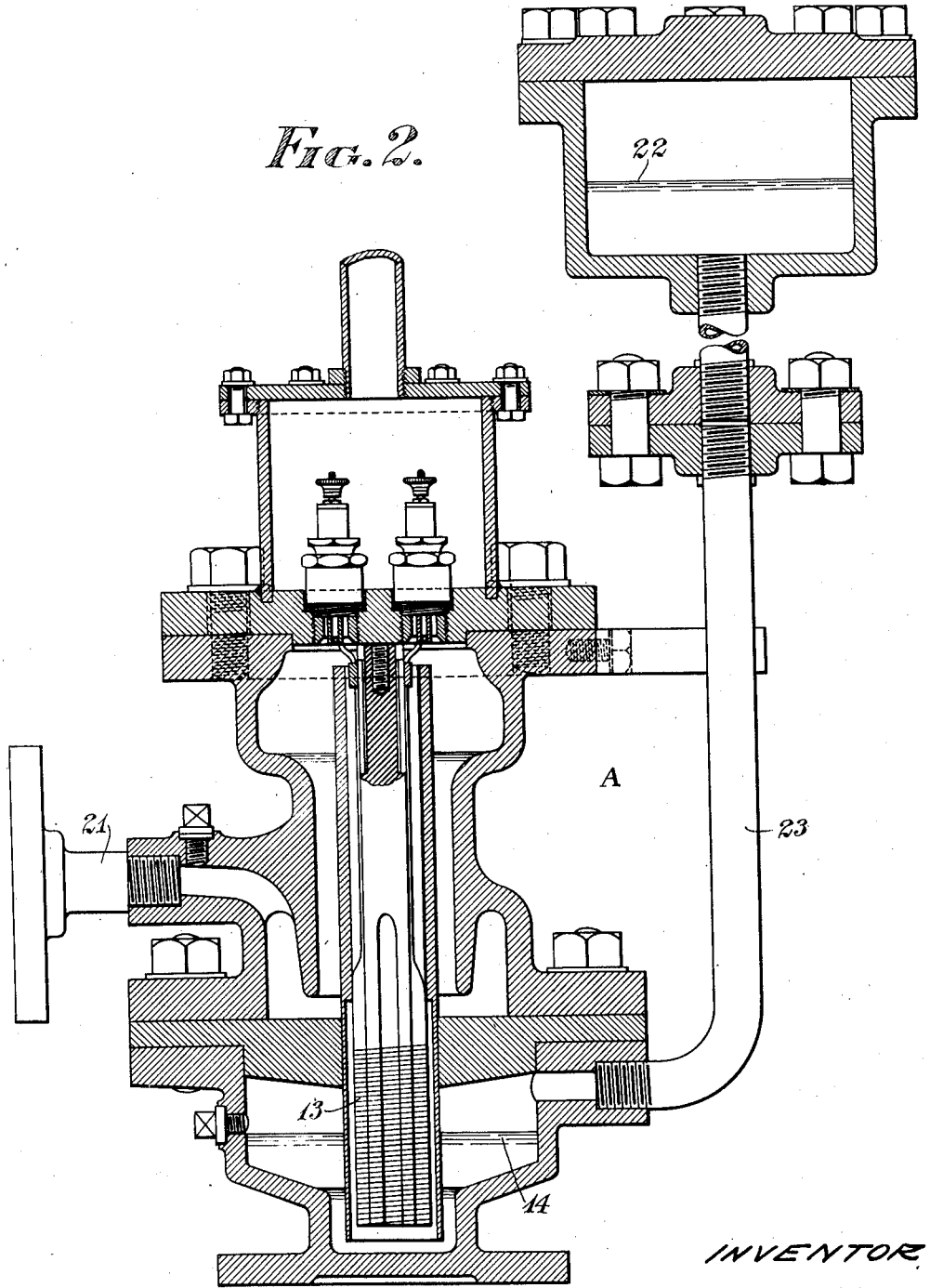
Figure 2 is a sectional side elevation of the form of transmitting apparatus preferably employed.

As shown and in carrying the present invention into effect, I provide, as previously described, apparatus in two main portions, namely, the transmitter A and indicator B which are interconnected by suitable insulated cable 10 and supplied with electric current preferably from a low voltage battery, generator or transformer. As shown, the current is supplied from a motor generator 11, 12.

The transmitter is constructed generally in accordance with that described in the complete specification of my Patent No. 231,595 except that the upper portion of the variable resistance coil 13, which is above the zone of maximum height to which the mercury 14 rises, is removed from the transmitter A and suitably connected at or adjacent to the indicating apparatus B by means of an interconnecting cable of relatively low resistance. It is proposed to call this the fixed portion 15 of the variable resistance 13. It will be further noted that this transmitter differs from that described in the said Patent No. 231,595 in that the electrical connections are led through the cover of the transmitter by means of ordinary sparking plugs which have been found of considerable use and value in simplifying and cheapening construction.

With the transmitter as shown in Fig. 2 connected to a tank containing petrol and water, as shown in Figs. 1 and 3, the hydraulic pressure of the column of water in the pipe 23, which terminates at its upper end in the enlarged vessel 22, reacts through the mercury seal 14 of the transmitter against the counter pressure produced by the normal composite charge of liquid contained in the tank 20, which is always full either of petrol or of water, or of partly petrol and partly water. When the tank 20 is full of water, the hydraulic pressure thereby produced on one side of the transmitter approximately balances that produced on the other side of the transmitter by the water column in the pipe A, and the mercury level inside the central tube of the transmitter containing the resistance 13 is approximately the same as the mercury level 14 in the outer vessel. Under these conditions, the resistance value 13 is at a maximum. When, however, the water in the tank 20 is gradually displaced by petrol, the hydraulic pressure produced by the charge in the tank on the transmitter, is proportionately reduced owing to the specific gravity of the petrol being less than that of water, and the hydraulic pressure produced by the column of water in the pipe A, which is maintained at practically constant level, owing to the effect of the enlarged vessel 22, causes the mercury in the central tube of the transmitter to rise and short circuit a portion of the resistance 13. When the tank 20 is full of petrol, the mercury column in the central tube will have risen to an amount above the mercury level 14 in the outer vessel, corresponding to the difference in hydraulic pressure produced by the water column in the pipe A and the petrol in the tank B, this being therefore also proportionate to the difference in the specific gravities of water and the petrol in the tank 20. The transmitter and its resistance 13 are so designed and constructed that, when the tank is full of the lightest petrol which it is intended to use, and which will therefore produce the maximum effect of specific gravity difference as compared with water, the resistance 13 will just be completely short circuited by the rising column of mercury in the central tube of the transmitter. If, however, a charge of petrol of higher density or specific gravity is taken into the tank, it will be understood that the hydraulic pressure difference between it and the standard column of water in the pipe A will be less, so that the column of mercury in the central tube, when the tank is full of such petrol, will not rise to its full height to short circuit the whole of the resistance 13. Assuming, therefore, that in the case of the charge of petrol of the lowest specific gravity, a correct reading was obtained on the indicator at the "tank full of petrol" position, owing to the complete short circuiting of the resistance 13, it will be clear that when the tank is full of petrol of higher specific gravity, the indicator will not show "tank full of petrol" correctly with the resistance 13 not therefore fully short circuiting, unless some compensation is effective in the electrical circuits to increase the amplitude of the pointer movement of the indicator, to correspond with the increase in the specific gravity of the charge of petrol.

The indicator B is preferably of the ratio coil type, similar to those described in the above-mentioned patents. The external fixed resistance 45 is also connected at or adjacent to the indicator B, but is divided into two portions, one portion 16 of which is contained, together with the above-mentioned fixed portion 15 of the variable resistance 13, in a new and additional piece of apparatus C which it is proposed to call a specific gravity compensator, the other portion being as shown in the drawing.

The specific gravity compensator C of the present invention contains the two resistances 15, 16 so arranged and constructed as to be adjustable by means of a movable arm or arms 17 controlled by hand, and attached to which there is also an indicating pointer 18 which moves across a scale 19 calibrated in specific gravities.

Though the two adjustable resistances 15, 16 in the specific gravity compensator C are not usually of the same value, they are uniformly graded, and arranged so as to be in circuit or short-circuited proportionately to the movement of the hand operated contact arm or arms 17. Furthermore, these resistances 15, 16 are arranged to be of such values relative to the other resistances 13 and 45 in circuit with the apparatus, that with both resistances 15 and 16 fully in circuit, a full scale reading of the indicator B will be obtained when the whole of the variable resistance 13 is short-circuited owing to the maximum movement of the mercury 14 in the transmitter A. They furthermore are so arranged, as far as values are concerned, that when they are both completely short-circuited by the full movement of the adjustable arm or arms 17 of the specific gravity compensator C, a full scale reading of the indicator B will be obtained with only half of the variable resistance 13 short-circuited as the result of half the maximum movement of the mercury 14 in the transmitter A. These arrangements are readily possible owing to the construction and principle of working involved, namely, a ratio coil indicator operated on the potentiometer principle.

It is evident that with the arrangements as described, providing that the maximum movement of the mercury 14 in the transmitter A is so regulated as to correspond to the difference in gravity between the lightest petrol or oil which it is desired to store in the tank 20 to which one side of the transmitter A is connected at 21, and the standard column of water 22 maintained in the pipe 23 to which the other side is connected, accurate indications of the quantity or depth of oil or petrol contained in the tank 20 will be obtained on the indicator B with the specific gravity compensator resistances 15, 16 fully in circuit, in which case, the pointer 18 also should be indicating accurately the specific gravity of the relatively light oil which is being measured.

Under these conditions, if the charge of petrol or oil 24 in the tank 20 is substituted by one of heavier quality and of a specific gravity such that there is only half the difference between it and water that there was with the charge previously contained in the tank, only half the maximum movement of the mercury 14 will be obtained in the transmitter A when the tank 20 is full of the heavier oil, in which case the indicator B should be reading at approximately half scale position, thereby giving an inaccurate measurement of the quantity of oil in the tank.

If under these conditions, however, the specific gravity compensator C is operated in such a manner as to short-circuit both its resistances 15, 16 owing to the above-mentioned features of the methods and apparatus used, the pointer of the indicator B will thereby move so as to give a full scale reading and will therefore give quite accurate indications or measurements of the quantity of that charge of oil 24 in the tank 20.

The above-mentioned conditions indicate the extreme limits of variations in specific gravity which can be readily and simply dealt with by the apparatus now proposed, but it will be clear that adjustments for any differences in specific gravity intermediate between the two above described extremes will be readily obtainable by intermediate adjustment of the resistances 15, 16 in the specific gravity compensator.

With the apparatus described, providing the specific gravity of the charge of petrol or oil 24 in the tank 20 is known, and assuming that the specific gravity compensator C has been correctly calibrated before hand, it is possible to set the specific gravity compensator C at a position corresponding to the specific gravity of the charge, and obtain accurate measurements on the indicator B of the depth or quantity of the charge contained in the tank 20.

In actual practice, however, the specific gravity of the charge 24 will not generally be known, at any rate, with sufficient accuracy to ensure accurate setting of and measurement with the apparatus as above described. In such cases, therefore, it is proposed to obtain, in a simple and accurate manner, a definite indication each time the storage tank 20 is filled, this indication being used to check the reading of the main measuring or indicating instrument B, and to permit any necessary adjustment by means of the specific gravity compensator C, to ensure accuracy in accordance with the specific gravity of the charge with which the tank 20 is being filled.

The means proposed for this purpose consist preferably of a pair of insulated electrical contacts 25, 25 such as ordinary motor car sparking plugs fitted to and through the side of the tank 20 at or adjacent to, the "tank full" position. Such insulated electrical contacts 25 are then interconnected by means of a suitable two-core cable 26 and a common return 26' through a low voltage battery 27' and small switch 28, to a galvanometer indicator 29 fixed at, or adjacent to, the main indicating and compensating apparatus B. Assuming that the contacts are fitted, as shown, at the three-quarter full line of the tank, a corresponding mark is made on the scale card at the three-quarter full position of the main indicator B.

In operation with the apparatus as described, when the tank 20 is filled with oil or petrol 24, it thereby displaces water 30 which is forced out through the bottom of the tank by suitable means, such as the pipe 27. The electrical contacts 25 fitted at the three-quarter full line will normally be short-circuited by the water 30, which effect will be shown by the galvanometer indicator 29 when the small switch 28 in circuit 26 is closed. When, however, the charge of oil or petrol 24 reaches the three-quarter full line, it will insulate the contacts 25, 25, thereby opening the galvanometer circuit 26, which will again be shown by the galvanometer indicator 29. Through the use of two slightly spaced spark plugs 25 the operator is able to determine the almost exact line of petrol through the short-circuiting of one while the other remains in circuit. At this time it is necessary to adjust the specific gravity compensator C until the pointer 31 of the main indicator B comes to the three-quarter full tank mark when the specific gravity compensator C is locked in position. Under these conditions, accurate indications will be obtained of the quantity and level of the charge of oil or petrol 24 in the tank until it is desirable or necessary to re-fill, when the same sequence of indications and adjustments will be obtained and carried out.

It is observed that, with the means provided by the present invention, not only is it possible to compensate for variations in density of oil or petrol of unknown specific gravity, but in so doing, owing to the marking and calibration of the specific gravity compensator C, the specific gravity of the charge is actually measured, and is shown on the compensator C until a fresh charge is placed in the tank.

Further, the application of the present invention is not necessarily confined to oil or petrol storage tanks subject to water displacement. In ordinary storage of liquids, the quality of which is liable to vary at times, with consequent appreciable variations in specific gravity, similar methods and apparatus can be adopted, except that the "tank full" indicator contacts 25 would, as indicated in Figure 4, have to be at or near the top of the tank 20, and would preferably be operated by means of a small float mechanism 31, as direct contact effects of water and oil or petrol, in such cases could not be utilized.

Furthermore, such accurate compensation for and measurement of specific gravity will be found to be of considerable value for ordinary motor car garage petrol pump storage measuring apparatus, which at the present time is generally subject to considerable error on account of varying specific gravities. In addition specific gravity compensated measurement, not only with oils, but with certain solutions and other liquids, used more particularly in chemical manufacture will be found to be highly advantageous.

In the slightly modified construction illustrated in Figure 3 of the drawings the contact plugs 25 instead of being connected directly to the tank 20 are connected to a fitting 32 which is connected by means of lengths of pipe 33 and 34 to the pipes 21 and 35 of the transmitting apparatus.

In actual use for oil fuel tank measurement, a full scale movement of the pointer of the indicator B is obtained with a maximum value of 20 ohms of the resistance 13, which is completely short circuited by the column of mercury in the central tube of the transmitter under conditions such that the tank is full of oil of the lowest specific gravity which is intended to be measured. Furthermore, this full scale movement is obtained under these conditions with the resistance 15 also having a value of 20 ohms, and the resistances 16 and 45 totalling 22.5 ohms divided equally between them. The ratio of the two arms of the bridge arrangement, by means of which the indicator B is operated, is as the resistance 15 to the combined resistances 16 and 45, when the tank is full of light oil, and the resistance 13 just short circuited by the mercury. This ratio changes to that of the combined resistances 13 and 15 against the combined resistances 16 and 45 when the tank is full of water. In actual present use, therefore, these ratios are respectively, 20: 22.5 with tank full of light oil and 40: 22.5 with tank full of water. The maximum resistance of the variable 13 is thus 20 ohms. The full resistance values in the specific gravity compensator are 20 ohms in the case of the resistance 15 and 11.25 ohms in the case of the resistance 16. These maximum resistance values when in circuit in the specific gravity compensator, ensure correct operation of the indicator when the tank contains a relatively light oil of specific gravity 0.84, the short circuiting movement of the mercury over resistance 13 which is also thus at a maximum, being in proportion to the difference in gravity between this oil and water, viz, 0.16. If, however, it is decided to charge the tank 20 with much heavier oil of say 0.92 specific gravity, one-half the resistance 13 will be short circuited when the tank is full of such oil, because the difference in specific gravity is halved between the oil and water and is 0.08. Unless an adjustment is made on the specific gravity compensator, therefore, the pointer of the indicator will be approximately at the "tank half full" position when the tank is actually full of relatively heavy oil. To make the indicator read correctly, the amplitude of the pointer is increased to full scale movement, by adjustment of the specific gravity compensator so as to short circuit completely the two resistances which it contains. The resistances thus left in the two arms of the bridge arrangement are—half of the resistance 13, viz. 10 ohms on one side, and the resistance 45, viz, 11.25 ohms on the other side. This ratio 10 to 11.25 is equal to the ratio 20 to 22.5, which, as explained above, ensures correct full scale movement of the pointer of the indicator B. Furthermore, when the tank 20 is again filled with water, even with the specific gravity compensator adjusted so that its two resistances are short circuited, a correct reading of the indicator B at the "water full" or zero position will be obtained, for the ratio of the two operating arms of the bridge arrangement will be that of the resistance 13, which is now at full value 20 ohms, to the resistance 45 which is still 11.25 ohms. This ratio is equivalent to the ratio 40: 22.5, which, as previously explained, ensures correct reading of the indicator at the "tank full of water" position. It will be seen that intermediate adjustments of the specific gravity compensator corresponding with intermediate specific gravities of oil charged into the tank will produce equivalent corrective effects upon the movement of the indicator B, and it is also clear that these variations in amplitude of the pointer scale movement are obtained by relative adjustments of resistance which have no effect upon the position of the pointer of the indicator at the "tank full" or zero position.

What I claim is:—

1. A manometric fluid pressure operated means for indicating the quantity of the liquid contents of a tank in which the fluid being measured, as oil, is replaced by another fluid, as water, comprising a differential pressure device, means for connecting one side of the device to the upper part of the tank and means for connecting the other side of the device to the lower part of the tank, a variable resistance, means whereby the resistance is controlled by the differential pressure device, and means for indicating the value of the variable resistance to thereby indicate the level of the oil in the tank, said means comprising a source of energy, a ratio coil indicator having two coils, a circuit including the variable resistance and one of the coils of the indicator and the source, a second circuit between said source and the other coil of the indicator, and means for compensating for variations in the specific gravity of oils of different densities which may be placed in the tank comprising a variable resistance included in each one of said circuits, and a common operating means for said variable resistance including a scale calibrated for specific gravity, whereby proportional amounts of said last named variable resistances may be simultaneously included in or excluded from the respective circuits.

2. A manometric fluid pressure operated means according to claim 1, and including a means for independently indicating a predetermined level of oil in the tank, whereby the specific gravity of the oil in the tank may be determined by adjusting said common operating means to cause the reading of the indicator to correspond with the predetermined level of the tank.

In testimony whereof I have hereunto signed my name.

HAROLD MARTIN.